United States Patent
Wang et al.

(10) Patent No.: US 7,486,503 B1
(45) Date of Patent: Feb. 3, 2009

(54) PORTABLE ELECTRONIC DEVICE STRUCTURE

(75) Inventors: Shih-Hsuan Wang, Taipei (TW); Yu-Chi Lin, Taipei (TW)

(73) Assignee: Inventec Corporation, Taipei (TW)

( * ) Notice: Subject to any disclaimer, the term of this patent is extended or adjusted under 35 U.S.C. 154(b) by 0 days.

(21) Appl. No.: 12/031,894

(22) Filed: Feb. 15, 2008

(51) Int. Cl.
*G06F 1/16* (2006.01)
*A47B 81/00* (2006.01)

(52) U.S. Cl. .................. 361/681; 361/683; 312/223.1; 248/917

(58) Field of Classification Search ............... 361/681, 361/683; 248/917–924; 312/223.1, 223.2; 345/1.1, 905; 349/58, 65
See application file for complete search history.

(56) References Cited

U.S. PATENT DOCUMENTS

| | | | |
|---|---|---|---|
| 4,438,458 A * | 3/1984 | Munscher | 348/838 |
| 6,430,038 B1 * | 8/2002 | Helot et al. | 361/681 |
| 6,654,234 B2 * | 11/2003 | Landry et al. | 361/681 |
| 6,757,157 B2 | 6/2004 | Lammintaus et al. | |
| 6,850,226 B2 | 2/2005 | Finke-Anlauff | |
| 2004/0114319 A1 * | 6/2004 | Hill et al. | 361/683 |

\* cited by examiner

*Primary Examiner*—Jayprakash N Gandhi
*Assistant Examiner*—Nidhi Desai
(74) *Attorney, Agent, or Firm*—Workman Nydegger

(57) ABSTRACT

A portable electronic device structure includes a first body having an input device, a second body having a screen, and a connection arm. The connection arm has two ends pivoted to the first body and the second body respectively, such that the second body moves relative to the first body via the connection arm, and thus, the second body has at least a first operation position where the second body is drawn close to the first body, or a second operation position where the second body is inclined to the first body at an angle for exposing the input device on the first body.

11 Claims, 14 Drawing Sheets

PORTABLE ELECTRONIC DEVICE STRUCTURE

BACKGROUND OF THE INVENTION

1. Field of the Invention

The present invention relates to a portable electronic device structure, and more particularly to a rotating structure applied in an ultra mobile personal computer.

2. Related Art

With the rapid development of science and technology, the electronic products commonly used in daily life have been continuously improved, especially the portable electronic devices such as notebook computers, tablet computers, translation machines, PDAs, and mobile phones, which can be taken along conveniently for processing and calculating personal data, have become the indispensable tools for business persons.

Currently, the portable electronic devices commonly used by business persons include two kinds, notebook computer and PDA. The notebook computer has a numerous calculating and storage capability and a large screen, but also has a large volume and a high weight. The PDA has a small volume for being easily taken along, but has a smaller calculating and storage capability and a smaller screen than the notebook computer. In view of this, MICROSOFT Corporation and INTEL Corporation have worked together and proposed an ultra mobile personal computer (UMPC). The ultra mobile personal computer (UMPC) has a volume and a screen size between that of the notebook computer and that of the PDA, and provides a touch panel for inputting similar to the tablet PC, such that the keyboard of a common notebook computer is omitted, so as to reduce the volume and weight. However, the inputting mode through using the keyboard is still quite convenient and time-saving, and thus, considering both the volume and the inputting convenience, some manufacturers propose a UMPC with a hidden keyboard, such as the UMPC No. U60 of GIGABYTE Corporation, and LIFEBOOK U1010 of FUJITSU Corporation, which both include two parts, a display and a keyboard. The U60 adopts a design that the keyboard is capable of sliding with respect to the display, and the U1010 adopts a design that the display is pivoted to the keyboard via a revolving shaft, such that the display may be moved close to the keyboard or moved away from the keyboard for the user to operate the keyboard.

The U.S. Pat. No. 6,757,157 and No. 6850226 have also disclosed a hidden keyboard for a portable electronic device, in which the portable electronic device includes a host and a display screen. The host is provided with a keyboard and a track. The display screen is capable of sliding along the track for shielding the keyboard on the host, and the display screen may be moved along the track to expose the keyboard and be inclined to the host at a certain angle, such that the user can also input through the keyboard on the host.

In order to provide the UMPC with a keyboard inputting function, the above published actual products or the designs disclosed in the patent all have two bodies, namely a display screen and a keyboard, and meanwhile the keyboard is shielded by the display screen or exposed for being operated by the user through the track or pivot axis design. However, the above published designs have the problems of making the overall volume become excessively large, or making the display screen size become small, or having a complicated structural design, which are not optimal designs for the UMPC structure.

SUMMARY OF THE INVENTION

The current portable electronic device such as an ultra mobile personal computer (UMPC) adopts a hidden keyboard design, or the track or pivot axis designs, but their structure designs are not the optimal design solutions for being applied to the UMPC in terms of volume, screen size, or construction. In view of this, the present invention is directed to an optimal design for the UMPC having a hidden keyboard.

The portable electronic device structure of the present invention includes a first body, having a first buckle member and an input device disposed on an upper surface thereof; a connection arm, having one end pivoted to an end edge of the first body, and having a blade spring disposed thereon; a second body, having a screen disposed on an upper surface thereof, and having a second buckle member and a moving member disposed on a lower surface thereof. The second buckle member is engaged with the first buckle member of the first body, and the moving member is capable of moving on the lower surface of the second body and is pivoted to the other end of the connection arm. The second body has a first operation position where the second buckle member is engaged with the first buckle member of the first body; a middle position where the second buckle member of the second body is released from the first buckle member of the first body, and the second body is separated apart from the first body for a certain distance through the blade spring; and a second operation position where the second body is inclined to the first body at an angle for exposing the screen.

The portable electronic device structure of the present invention is disposed with the connection arm and the moving member. By means of movably pivoting the connection arm to the first body and the second body, and through the blade spring on the connection arm, the user may easily adjust the height and angle for the screen. Furthermore, the design of the present invention is different from that provided in the above published patents which may enlarge the overall volume and reduce the screen size of the display screen. Therefore, the present invention is capable of providing a hidden keyboard design for the UMPC, and adopts a special designed structure to meet the volume requirements of the UMPC.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, which thus is not limitative of the present invention, and wherein.

DETAILED DESCRIPTION OF THE INVENTION

As for the portable electronic device structure disclosed in the present invention, the portable electronic device herein refers to a notebook computer, a PDA, an ultra mobile personal computer (UMPC), or a mobile phone, and the UMPC is taken as a specific embodiment below for demonstrating the present invention in detail.

Figure 1:
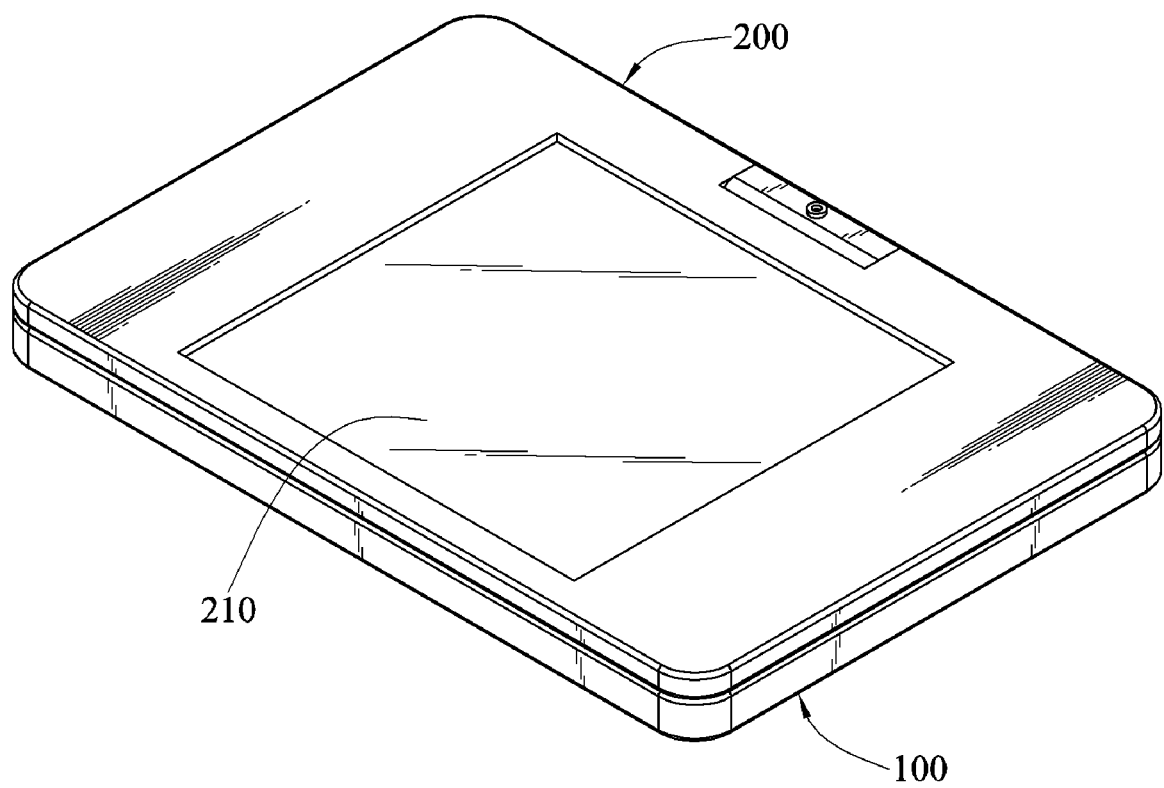
FIG. 1 is a perspective view of a portable electronic device structure according to an embodiment of the present invention.
Figure 2:
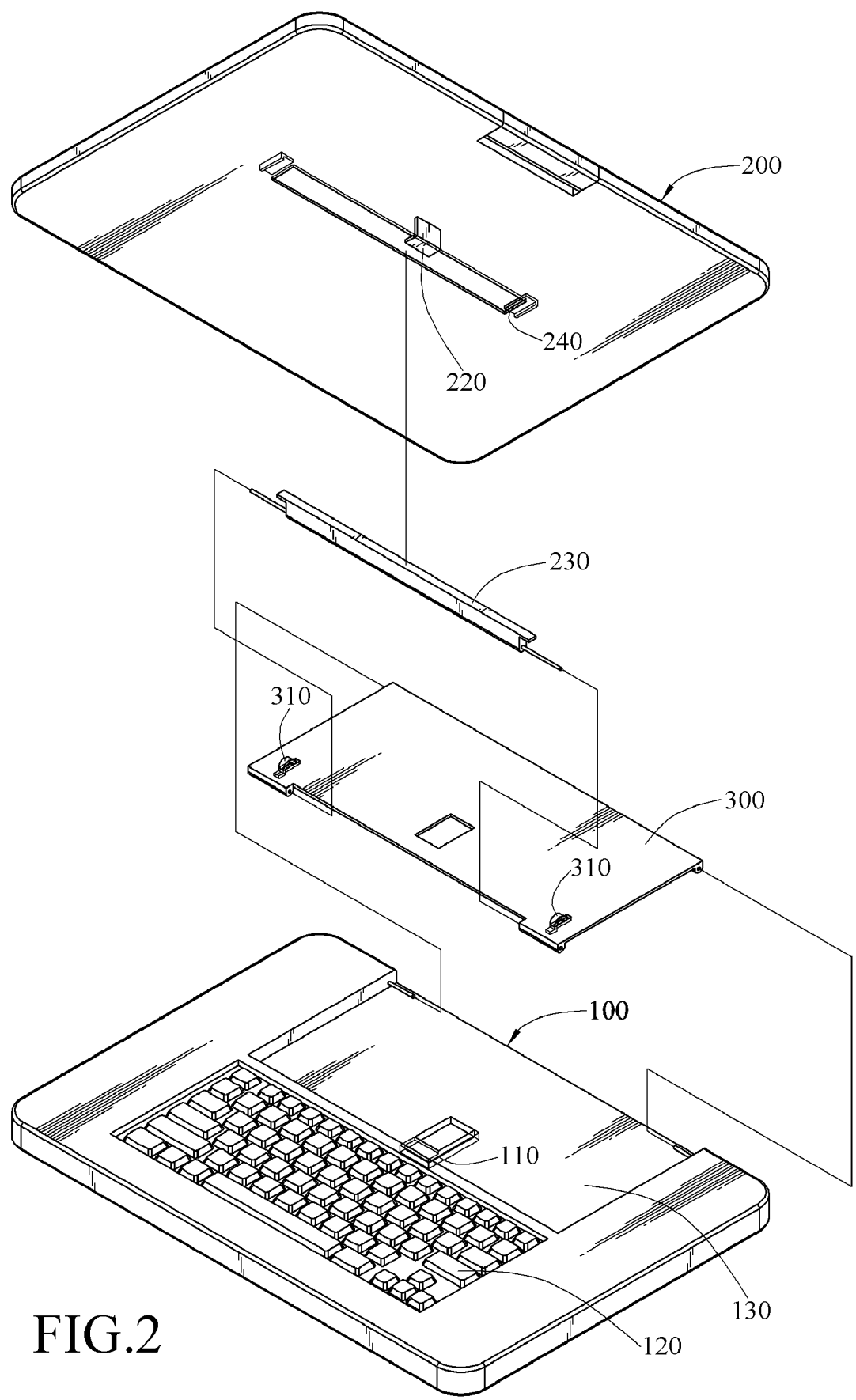
FIG. 2 is an exploded view of a portable electronic device structure according to an embodiment of the present invention.

Referring to FIGS. 1 and 2, FIG. 1 is a perspective view of a portable electronic device structure according to an embodiment of the present invention. FIG. 2 is an exploded view of the portable electronic device structure according to an embodiment of the present invention. The portable electronic device structure includes a first body 100, a second body 200, and a connection arm 300.

The first body 100 is the keyboard portion of the UMPC, which is flat cuboid-shaped and defines an upper surface, a lower surface, and four side surfaces. An input device 120 is disposed at the upper surface close to the lower side surface, which is a QWERTY keyboard formed by a plurality of keys. Furthermore, an accommodation slot 130 is disposed on the upper surface of the first body 100, and extended with a first buckle member 110 close to the input device 120. A pair of pivot holes is disposed on an end edge of the upper surface close to the upper side surface, for accommodating a pivot axis. An elastic element 320 is sleeved on the pivot axis, and the elastic element 320 is a spring. A battery container is disposed at the lower surface for accommodating a battery set, and the battery set is disposable battery or rechargeable battery (not shown). A plurality of output/input terminals and terminals for being connected to external devices (not shown) are further disposed on the left and right side surfaces. The plurality of output/input terminals is used for outputting/inputting audio-visual signals, and the terminals for being connected to the external devices are used for externally connecting to the devices such as external disk drive, optical disk drive, or disk recorder.

The second body 200 is the screen portion of the UMPC. The second body 200 is an approximate flat cuboid-shaped fitted with the first body 100, and defines an upper surface and a lower surface. The second body has a screen 210, a camera lens, and at least one loudspeaker (not shown) on the upper surface, and has a plurality of buttons (such as power key or direction key, not shown) disposed at the periphery of the screen. The screen 210 is a touch screen used for providing images to the user and for the user to input through the touch mode. The camera lens is used for capturing images, and offers the user with a video communication function. The loudspeaker is used for outputting an audio source. A groove 240 and a second buckle member 220 are disposed at the middle position of the lower surface for the second body 200. A moving member 230 is disposed in the groove 240 and capable of moving within the groove 240. A pair of pivot holes is also disposed within the moving member 230 for accommodating a pivot axis. An elastic element 320 is sleeved to the pivot axis, and the elastic element is a spring.

The connection arm 300 is an approximate rectangular sheet with a length and a width slightly smaller than that of the accommodation slot 130, so as to be accommodated within the accommodation slot 130. The connection arm 300 has a revolving shaft at each end (which falls within the conventional art and thus will not be repeated in detail herein), and a protruded and arc-shaped blade spring 310 is disposed on the connection arm 300.

In the portable electronic device structure according to the present invention, the revolving shafts at the two ends of the connection arm 300 are respectively pivoted to the pivot axis at the end edge of the first body 100 and the pivot axis of the moving member for the second body 200, and the moving member is capable of moving within the groove 240 of the second body 200, such that the second body 200 is capable of moving or rotating with respect to the connection arm 300, and thereby the second body 200 is made to move or rotate with respect to the first body 100.

In an embodiment of the present invention, the second buckle member 220 of the second body is fitted and engaged with the first buckle member 110 of the first body 100.

In an embodiment of the present invention, the blade spring 310 disposed on the connection arm 300 is located on the upper side of the connection arm 300, and the protruded blade spring 310 in an arc-shaped structure pushes against the second body 200.

In another embodiment of the present invention, the blade spring 310 disposed on the connection arm 300 is located on the lower side of the connection arm 300, and the protruded blade spring 310 in the arc-shaped structure pushes against the first body 100.

Figure 3:
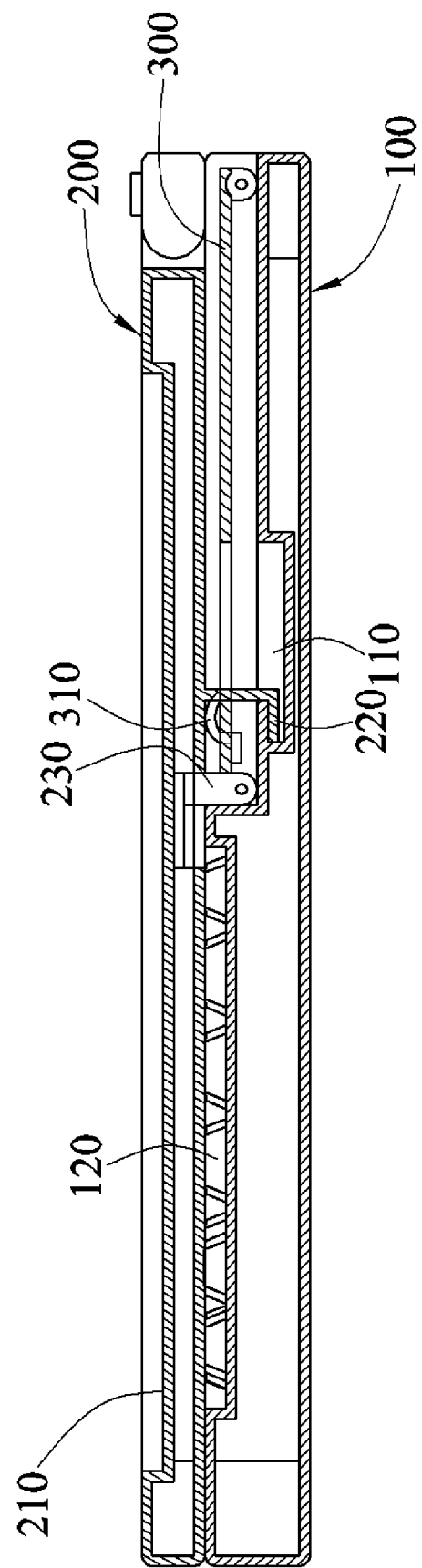
FIG. 3 is a side view of the portable electronic device structure according to an embodiment of the present invention, when the second body is at the first operation position.

FIG. 3 is a side view of the portable electronic device structure according to an embodiment of the present invention, when the second body 200 is at the first operation position. The first operation position refers to the position where the second body 200 gets close to the first body 100 when the second buckle member 220 of the second body 200 is engaged with the first buckle member 110 of the first body 100. At the first operation position, the first buckle member 110 and the connection arm 300 are accommodated in the accommodation slot 130, and the second body 200 and the first body 100 are engaged together, without moving relatively to each other, which is the first operation state when the user merely uses the second body 200 of the portable electronic device structure.

Figure 4A:
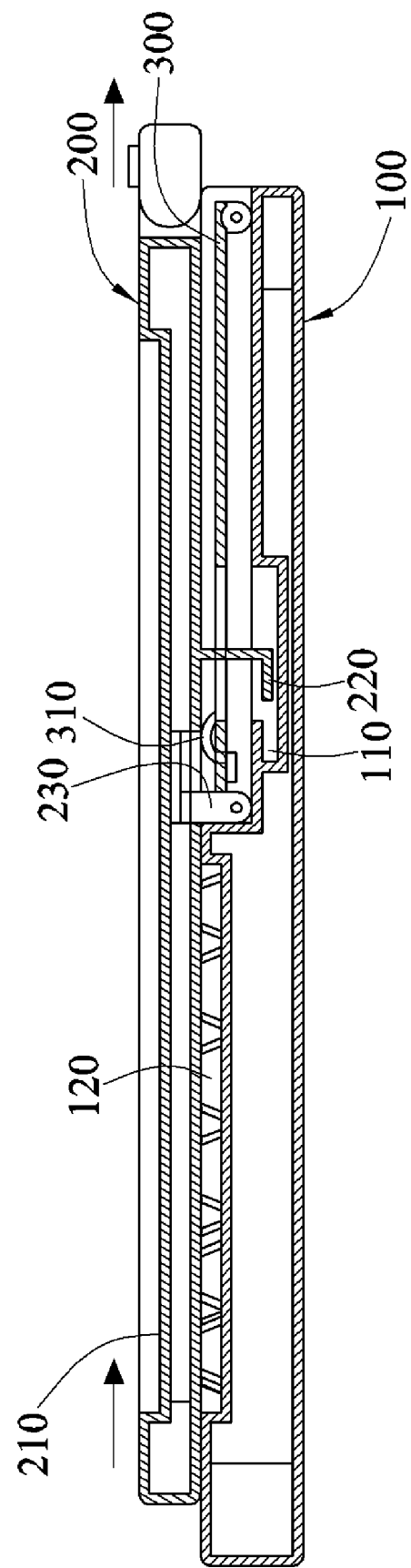
FIG. 4A is a side view of the portable electronic device structure according to an embodiment of the present invention, when the second buckle member of the second body is released from the first buckle member of the first body.

FIG. 4A is a side view of the portable electronic device structure according to an embodiment of the present invention, when the second buckle member 220 of the second body 200 is released from the first buckle member 110. As shown in FIG. 4A, if it is intended to change the operating status of the portable electronic device, the user firstly pushes the second body 200, such that the moving member 230 of the second body 200 is moved within the groove 240, so as to force the second buckle member 220 of the second body 200 to be released from the first buckle member 110 of the first body 100.

Figure 4B:
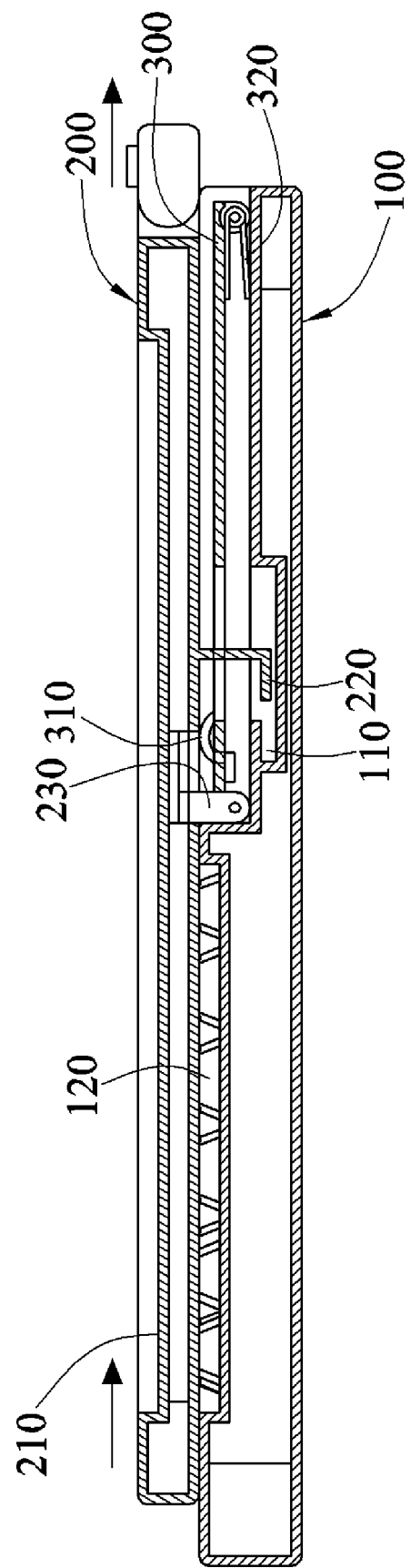
FIGS. 4B and 4C are side views of a portable electronic device structure according to another embodiment of the present invention, when the second buckle member of the second body is released from the first buckle member of the first body.
Figure 4C:
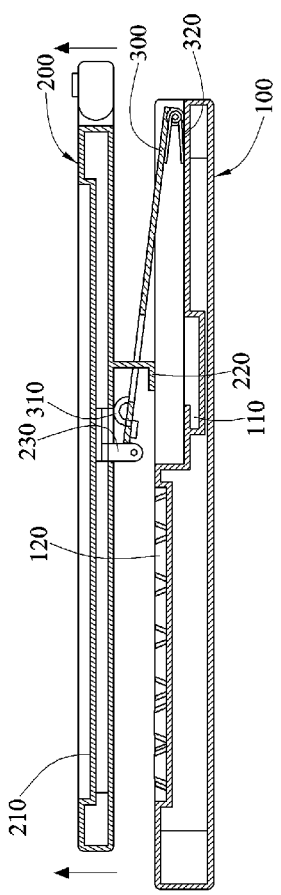

FIGS. 4B and 4C are side views of a portable electronic device structure according to another embodiment of the present invention, when the second buckle member 220 of the second body 200 is released from the first buckle member 110. As shown in FIGS. 4B and 4C, if it is intended to change the operating status of the portable electronic device, the user firstly pushes the second body 200, such that the moving member 230 of the second body 200 is moved within the groove 240, so as to force the second buckle member 220 of the second body 200 to be released from the first buckle member 110 of the first body 100. At this time, through an elastic element 320 disposed at the pivot axis where the connection arm 300 is pivoted to the first body 100, an elastic force is applied to release the connection arm 300 from the first body 100.

Figure 4D:
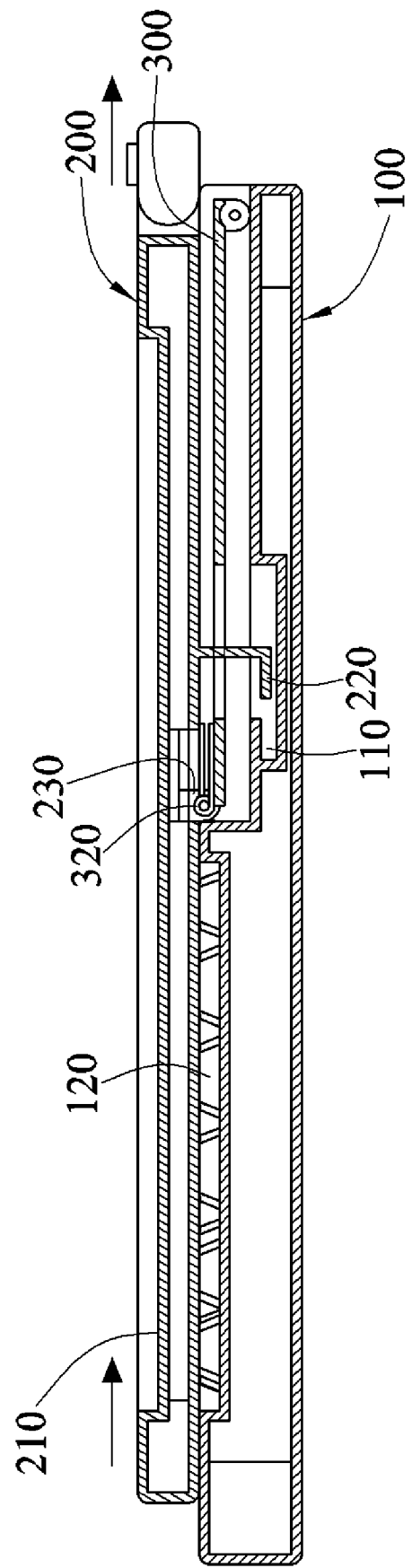
FIGS. 4D and 4E are side views of a portable electronic device structure according to still another embodiment of the present invention, when the second buckle member of the second body is released from the first buckle member of the first body.
Figure 4E:
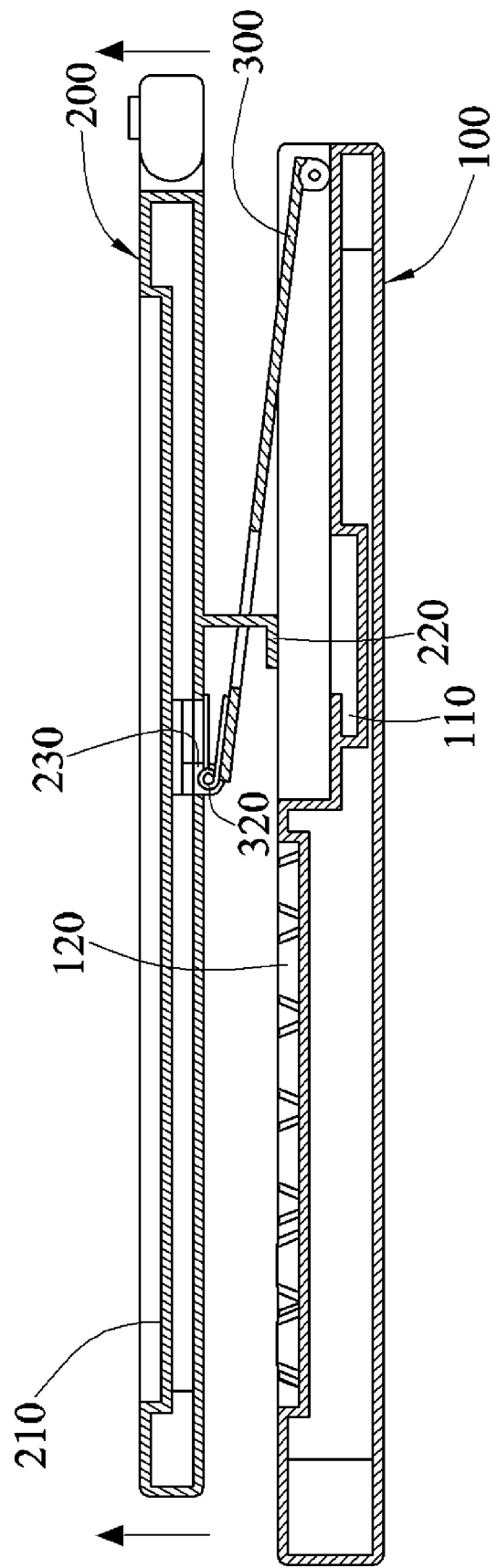

FIGS. 4D and 4E are side views of a portable electronic device structure according to still another embodiment of the present invention, when the second buckle member 220 of the second body 200 is released from the first buckle member 110. As shown in FIGS. 4D and 4E, if it is intended to change the operating status of the portable electronic device, the user firstly pushes the second body 200, such that the moving member 230 of the second body 200 is moved within the groove 240, so as to force the second buckle member 220 of the second body 200 to be released from the first buckle member 110 of the first body 100. At this time, through an elastic element 320 disposed at the pivot axis where the connection arm 300 is pivoted to the moving member 230 of the second body 200, an elastic force is applied to release the connection arm 300 from the second body 200.

Figure 4F:
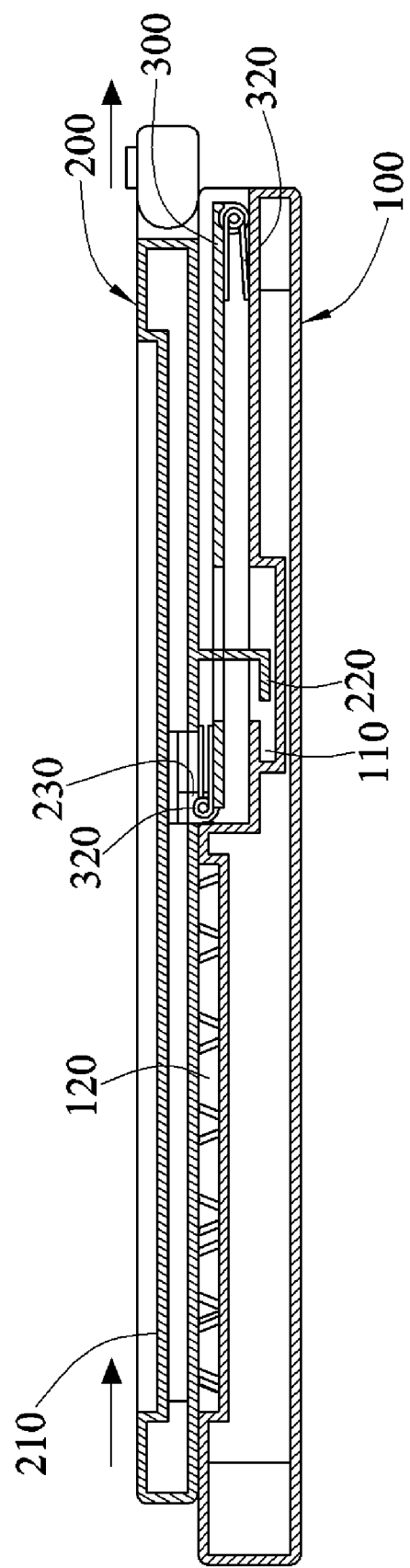
FIGS. 4F and 4G are side views of a portable electronic device structure according to yet another embodiment of the present invention, when the second buckle member of the second body is released from the first buckle member of the first body.
Figure 4G:
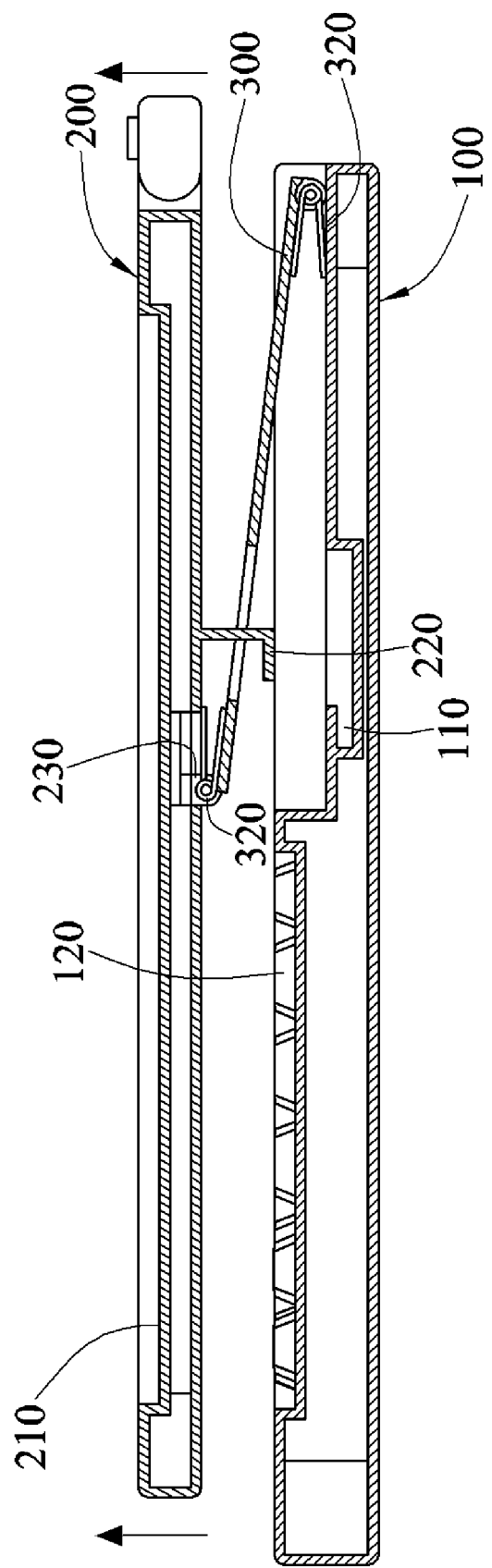

FIGS. 4F and 4G are side views of a portable electronic device structure according to yet another embodiment of the present invention, when the second buckle member 220 of the second body 200 is released from the first buckle member 110. As shown in FIGS. 4F and 4G, if it is intended to change the operating status of the portable electronic device, the user firstly pushes the second body 200, such that the moving member 230 of the second body 200 is moved within the groove 240, so as to force the second buckle member 220 of the second body 200 to be released from the first buckle member 110 of the first body 100. At this time, through two elastic elements 320 respectively disposed at the pivot axis where the connection arm 300 is pivoted to the first body 100 and at the pivot axis where the connection arm 300 is pivoted to the moving member 230 of the second body 200, an elastic force is applied to release the connection arm 300 from the first body 100 and to release the connection arm 300 from the second body 200.

Figure 5A:
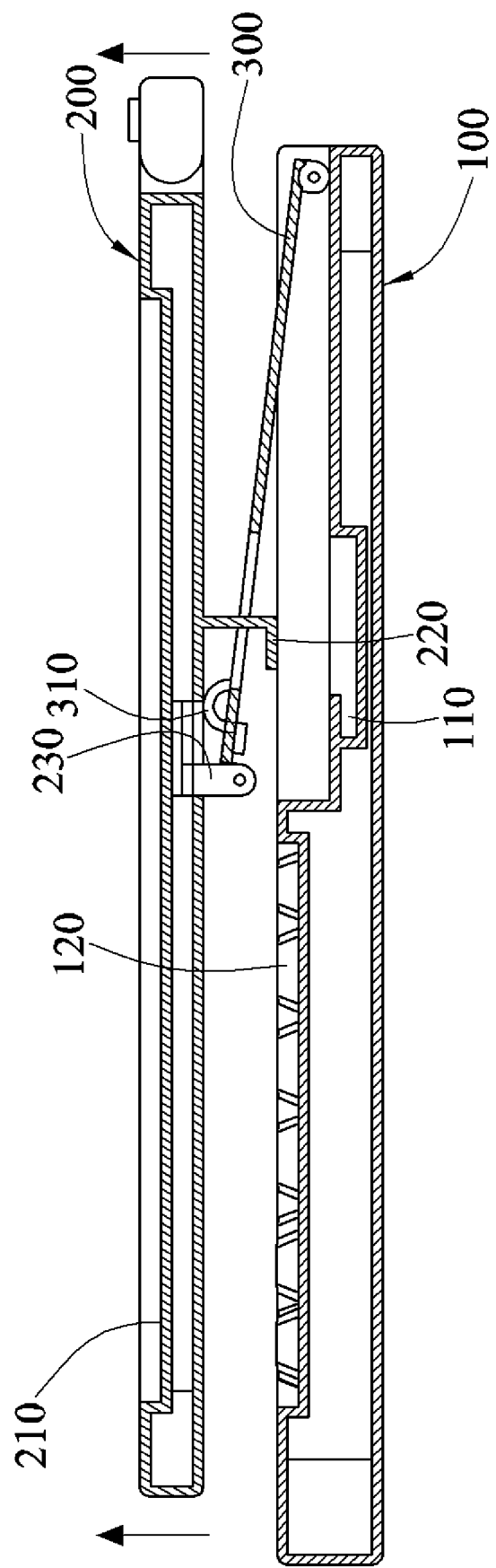
FIG. 5A is a side view of a portable electronic device structure according to an embodiment of the present invention, when the second body is at a middle position.

FIG. 5A is a side view of a portable electronic device structure according to an embodiment of the present invention, when the second body 200 is at a middle position. The middle position refers to a position after the second buckle member 220 of the second body 200 is released from the first buckle member 110 and the first body 100. The protruded and arc-shaped blade spring 310 disposed on the upper side of the connection arm 300 is used to push against the second body 200, such that the first body 100 is spaced apart from the second body 200 for a certain distance. Through such a distance, the user can easily adjust the height and position of the second body 200 and the angle between the second body 200 and the first body 100.

Figure 5B:
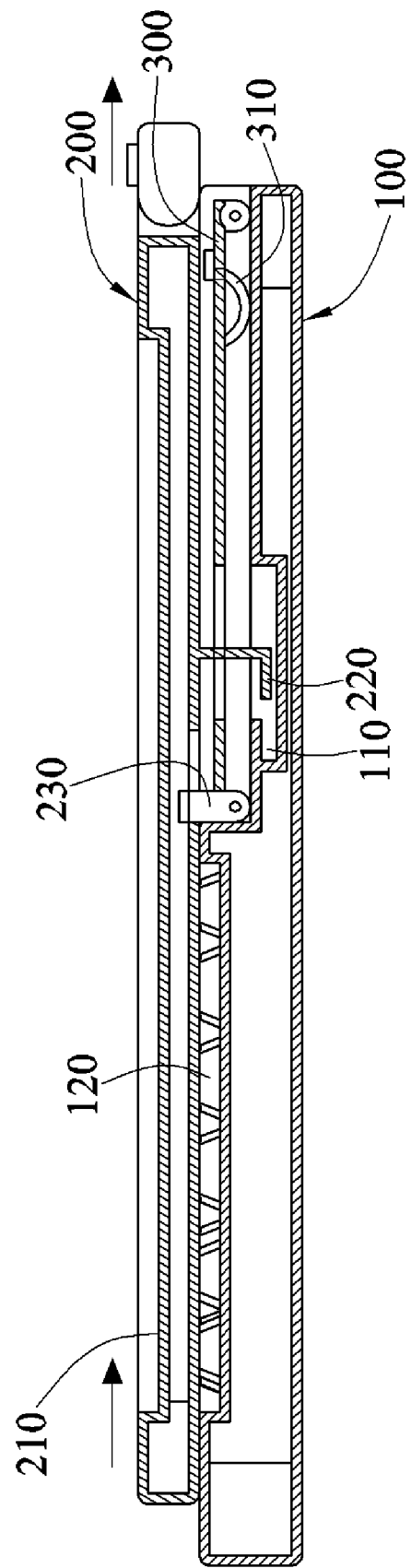
FIGS. 5B and 5C are side views of a portable electronic device structure according to another embodiment of the present invention, when the second body is at a middle position.
Figure 5C:
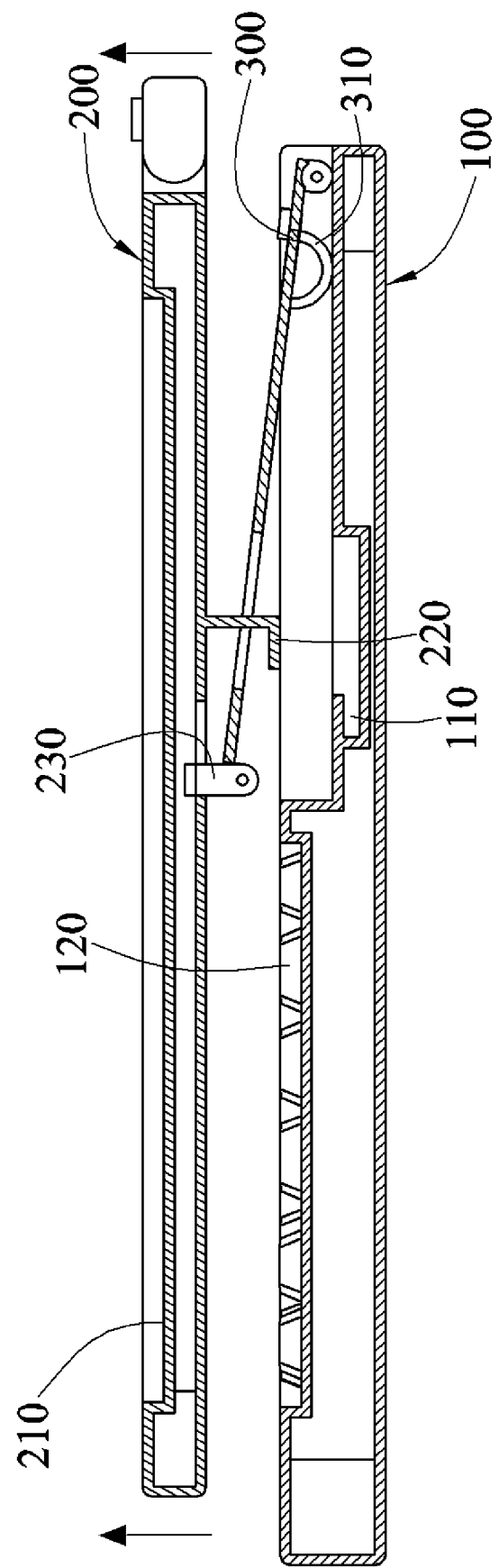

FIGS. 5B and 5C are side views of a portable electronic device structure according to another embodiment of the present invention, when the second body 200 is at a middle position. The middle position refers to a position after the second buckle member 220 of the second body 200 is released from the first buckle member 110 and the first body 100. The protruded and arched blade spring 310 disposed on the lower side of the connection arm 300 is used to push against the first body 100, such that the first body 100 is separated from the second body 200 for a certain distance. Through such distance, the user can easily adjust the height and position of the second body 200, as well as the angle between the second body 200 and the first body 100.

Figure 6:
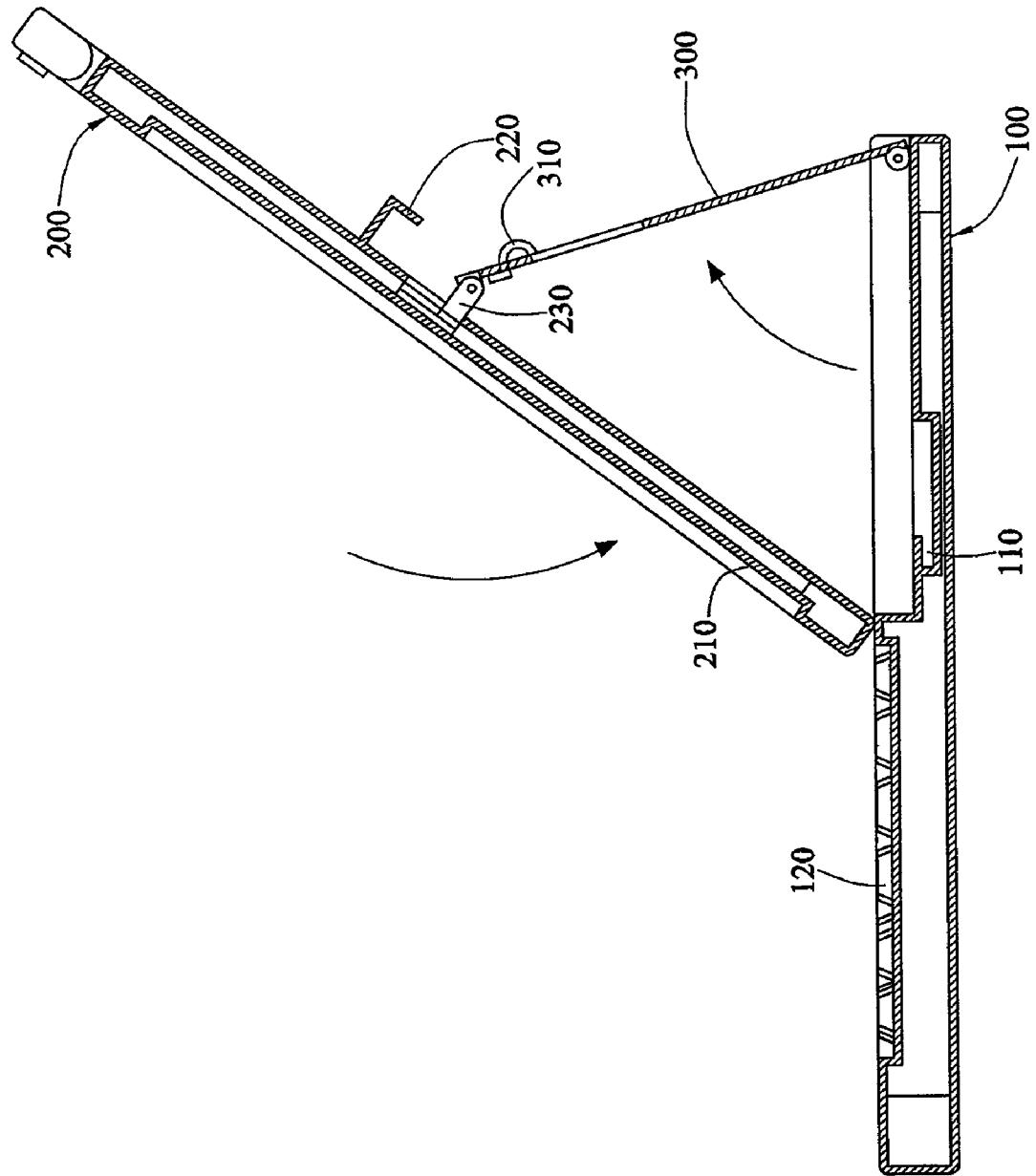
FIG. 6 is a side view of a portable electronic device structure according to an embodiment of the present invention, when the second body is at a second operation position.

FIG. 6 is a side view of a portable electronic device structure according to an embodiment of the present invention, when the second body 200 is at a second operation position. The second operation position refers to the position where the second body 200 is inclined to the first body 100 to expose the input device 120. Through the pivoting relationship between the revolving shafts at two ends of the connection arm 300 with the pivot axis of the first body 100 and that of the moving member of the second body 200 respectively, the second body 200 rotates and moves with respect to the first body 100, which is the second operation state when the user needs to use both the first body 100 and the second body 200 of the portable electronic device structure.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A portable electronic device structure, comprising:
    a first body, having a first buckle member and an input device disposed thereon;
    a connection arm, having one end being pivoted to one end edge of the first body, and having a blade spring disposed thereon; and
    a second body, having a screen disposed on an upper surface thereof, and having a second buckle member and a moving member disposed on a lower surface thereof, wherein the second buckle member is engaged with the first buckle member of the first body, and the moving member is capable of moving on the lower surface of the second body and is pivoted to the other end of the connection arm,
    wherein the second body has a first operation position where the second buckle member is engaged with the first buckle member of the first body; a middle position where the second buckle member of the second body is released from the first buckle member of the first body, and the second body is spaced apart from the first body for a certain distance through the blade spring; and a second operation position where the second body is inclined to the first body at an angle for exposing the input device.

2. The device structure as claimed in claim 1, wherein the second body further has a groove on the lower surface thereof, provided for the moving member to move therein.

3. The device structure as claimed in claim 1, wherein the first body further has an accommodation slot on the upper surface thereof for accommodating the first buckle member and the connection arm.

4. The device structure as claimed in claim 1, wherein the blade spring is disposed on an upper side of the connection arm.

5. The device structure as claimed in claim 1, wherein the blade spring is disposed on a lower side of the connection arm.

6. The device structure as claimed in claim 1, further comprising an elastic element disposed at the pivot axis where the connection arm is pivoted to the first body.

7. The device structure as claimed in claim 6, wherein the elastic element is a spring.

8. The device structure as claimed in claim 1, further comprising an elastic element disposed at the pivot axis where the connection arm is pivoted to the moving member of the second body.

9. The device structure as claimed in claim 8, wherein the elastic element is a spring.

10. The device structure as claimed in claim 1, further comprising two elastic elements respectively disposed at the pivot axis where the connection arm is pivoted to the first body and at the pivot axis where the connection arm is pivoted to the moving member of the second body.

11. The device structure as claimed in claim 10, wherein the elastic element is a spring.

\* \* \* \* \*